United States Patent
Kuchly et al.

(10) Patent No.: US 9,663,072 B2
(45) Date of Patent: May 30, 2017

(54) CONNECTION DEVICE BETWEEN A WINDSCREEN WIPER AND AN ADAPTER OF AN ARM

(71) Applicant: Valeo Systèmes d'Essuyage, Le Mesnil Saint Denis (FR)

(72) Inventors: Nicolas Kuchly, Issoire (FR); Vincent Garibaldi, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/069,337

(22) Filed: Mar. 14, 2016

(65) Prior Publication Data
US 2016/0272162 A1    Sep. 22, 2016

(30) Foreign Application Priority Data
Mar. 19, 2015 (FR) ...................................... 15 52276

(51) Int. Cl.
*B60S 1/52* (2006.01)
*B60S 1/38* (2006.01)
*B60S 1/40* (2006.01)

(52) U.S. Cl.
CPC ............ *B60S 1/524* (2013.01); *B60S 1/3862* (2013.01); *B60S 1/3863* (2013.01); *B60S 2001/4054* (2013.01)

(58) Field of Classification Search
CPC ..... B60S 1/3862; B60S 1/4038–1/4048; B60S 1/4064; B60S 2001/4051–2001/4061
USPC .................................................. 15/250.04
See application file for complete search history.

(56) References Cited

U.S. PATENT DOCUMENTS

| 2007/0214593 A1* | 9/2007 | Boland ................. | B60S 1/3848 |
| | | | 15/250.23 |
| 2015/0013095 A1* | 1/2015 | Caillot ................. | B60S 1/3862 |
| | | | 15/250.34 |

FOREIGN PATENT DOCUMENTS

| DE | 102012224474 A1 | 7/2014 | | |
| EP | 2692598 A1 | 2/2014 | | |
| FR | 2991949 A1 * | 12/2013 | ............ | B60S 1/3862 |
| GB | 2356130 A * | 5/2001 | ............ | B60S 1/4006 |
| WO | 2013186503 A1 | 12/2013 | | |

OTHER PUBLICATIONS

FR2991949A1 (machine translation), 2013.*
Preliminary Search Report issued in corresponding French Application No. FR1552276, mailed Feb. 3, 2016 (6 pages).

* cited by examiner

*Primary Examiner* — Andrew A Horton
(74) *Attorney, Agent, or Firm* — Osha Liang LLP

(57) ABSTRACT

The invention relates to a connection device 1 suitable for linking a windscreen wiper of a window of a vehicle to a wiper arm, comprising a means 3 for securing the windscreen wiper topped by a means 4 for linking to an adapter linked to the wiper arm, characterized in that it comprises a platform 6 derived from the securing means 3 and a component 7 which emerges on the platform 6, and in which the component 7, the platform 6 and the link means 4 at least partially delimit a housing 8 suitable for receiving at least a part of the adapter.
Application to motor vehicles.

13 Claims, 3 Drawing Sheets

CONNECTION DEVICE BETWEEN A WINDSCREEN WIPER AND AN ADAPTER OF AN ARM

Figure 1:
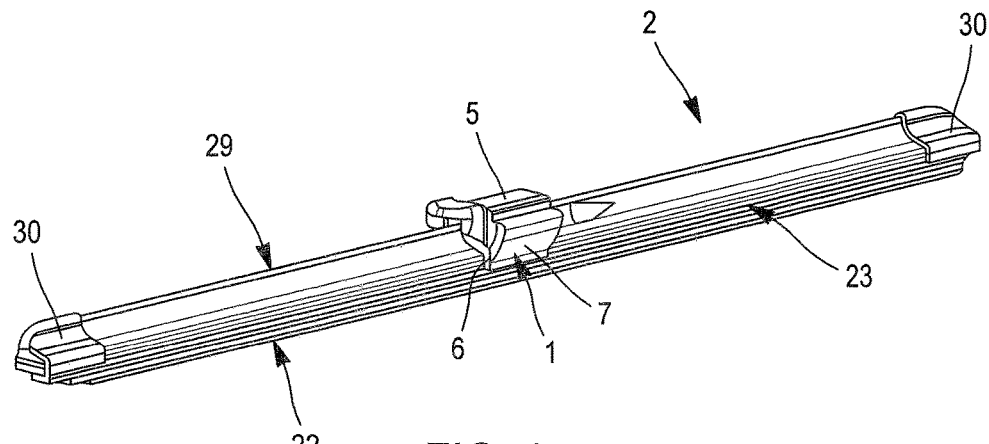

The field of the present invention is that of the equipment for vehicles, and more particularly that of the equipment for wiping the windows of a vehicle. The present invention targets a connection device participating in a mechanical link between a wiper arm and a windscreen wiper suitable for wiping a windscreen or a rear window of a vehicle.

The motor vehicles are commonly equipped with windscreen wiper systems for ensuring a wiping and a washing of the windscreen and avoiding the view that the driver has of his or her environment being disrupted. These windscreen wipers are conventionally driven by an arm performing an angular to-and-fro movement and comprising elongate wipers, themselves bearing scraper blades produced in an elastic material. These blades rub against the windscreen and dispel the water by bringing it out of the field of vision of the driver. The wipers are produced in the form, either, in a conventional version, of articulated spreader arms which hold the scraper blade at a number of discrete positions, or, in a more recent version called "flat blade", of a semi-rigid assembly which holds the scraper blade over its entire length. In this second solution the wiper is attached to the rotating arm of the windscreen wiper by an assembly consisting of a mechanical connector and an adapter. The mechanical connector is a part which is crimped directly onto the flat wiper, whereas the adapter is an intermediate part which allows the connector to be fixed onto the windscreen wiper arm. These two parts are linked to one another by a transverse axis which allows their relative rotation, in a plane at right angles to the windscreen passing through the arm.

The wiper device described above is commonly combined with a system for spraying a liquid onto the windscreen. Such a spraying system for example takes the form of nozzles installed on the hood of the vehicle. One drawback with this type of system lies in the fact that it is necessary to form holes in the hood. Another disadvantage inherent in this technical solution lies in the distance which separates the nozzle from the surface of the windscreen that is to be covered with liquid. The flow of air over the hood and over the windscreen when the vehicle is moving disrupts the spray of liquid.

An alternative technology has emerged, known by the term "aquablade". According to this technology, the windscreen wiper comprises a boom for spraying the washing liquid onto the windscreen. Such a boom is formed by a duct which extends along the windscreen wiper along a main longitudinal axis of extension of this wiper. This duct is provided with spraying orifices distributed along this axis. This technology is particularly effective but presents a drawback represented by its cost.

The aim of the present invention is therefore to resolve the drawbacks described above by devising a liquid spraying system which suffers little or not at all from the aeraulic disturbances and which presents a cost that is as low as possible, while best ensuring the function of spraying the liquid onto the windscreen.

Therefore, the subject of the invention is a connection device, otherwise called link connector, suitable for linking a windscreen wiper of a window of a vehicle to a wiper arm, comprising a means for securing to the windscreen wiper topped by a means for linking to an adapter linked to the wiper arm, innovative in that it comprises a platform derived from the securing means and a component which emerges on the platform, and in which the component, the platform and the link means at least partially delimit a housing suitable for receiving at least a part of the adapter.

According to an exemplary embodiment, an orifice spraying a liquid is formed on the component. In such a situation, the component becomes a liquid spraying component. A spraying orifice is mentioned here and below, such an expression covering the case of a single orifice or the case of a plurality of orifices. Thus, when the words "spraying orifice" are used below in the singular, it should be understood that there may be a number of spraying orifices. Similarly, when the words "spraying orifice" are used in the plural, it will be understood that it may mean a single spraying orifice.

According to another exemplary embodiment, at least one duct is formed in the component to transport the liquid from a liquid inlet to said orifice.

Advantageously, the link means comprises a pivoting means suitable for rotating the link means about an axis relative to the adapter. In such a situation, the spraying orifice is formed at the level of the axis, for example to +/−2 mm from the axis, or beyond the latter, moving away from the platform.

According to a variant of the invention, the component is delimited by an inner wall facing towards the housing, an outer wall, at least two lateral walls joining the inner wall to the outer wall and a distal wall opposite the platform, the spraying orifice being formed exclusively in the outer wall and/or in the lateral wall or walls.

It will be noted that a feed nozzle is formed on one of the lateral walls delimiting the component. This feed nozzle delimits the liquid inlet described above.

The link means extends in a direction at right angles to a wiping plane of the windscreen wiper, the component extending in a second direction. An angle is then formed between the first direction and the second direction and this angle lies between 15° and 55°.

According to one embodiment, the securing means comprises at least two hooks suitable for fixing at least a part of a constituent structure of the windscreen wiper. Each of the hooks can then take the form of a "U", a first face of the "U" being able to be in contact with a top face of the structure of the windscreen wiper, a second face of the "U" being able to be in contact with a bottom face of the structure of the windscreen wiper and a third face links the first face to the second face.

Advantageously, the securing means, the link means and the platform are of a single piece, that is to say moulded simultaneously from a same polymer material.

According to an exemplary implementation, the component and the platform are of a single piece. It will be understood here that the component and the platform forms a unitary assembly, for example derived from a same moulding from a same polymer material, possibly jointly with the securing means and the link means.

Alternatively, the component and the platform comprise fixing means arranged to assemble the component on the platform. These fixing means are, for example, implemented by complementary forms formed respectively on the component and on the platform.

It will be noted that the fixing means are slide-fixing means. A method of assembling the component on the platform in which the component is translated longitudinally onto the platform is provided here.

Alternatively, the fixing means are clipping means. A method of assembling the component on the platform in which the component is rotated about a longitudinal axis of the platform is envisaged here.

The invention also targets a windscreen wiper comprising a blade suitable for being applied against a window of a vehicle, a flexible structure linked to the blade and a connection device comprising at least any one of the features presented above, such a connection device being secured to the flexible structure at the centre thereof, notably substantially at the centre thereof, in a longitudinal direction of the flexible structure.

Such a wiper can comprise an adapter linked in rotation with the connection device, the adapter extends at least partly into the housing.

The invention also covers a system for wiping a window of a vehicle comprising a windscreen wiper as described above and a wiper arm, in which a part of the wiper arm extends into the housing.

By employing a part present on the windscreen wiper to implement the liquid spraying, a proximity is guaranteed which limits the disturbances due to the flow of air. The invention is also economically advantageous since the liquid spraying function is combined on the connection device used to link the windscreen wiper to the driving arm.

The advantages of the form of the connection device according to the invention lie firstly in a protection of the link between the adapter and the connection device against external attacks and impurities.

When the component is a liquid spraying component because it comprises at least one spraying orifice, one advantage lies in the possibility of locating the orifice at a distance from the window. This makes it possible to open the spraying angles and thus cover the entire surface of the window swept by the wiper arm with liquid by means of a single spraying component linked to the connection device.

Figure 2:
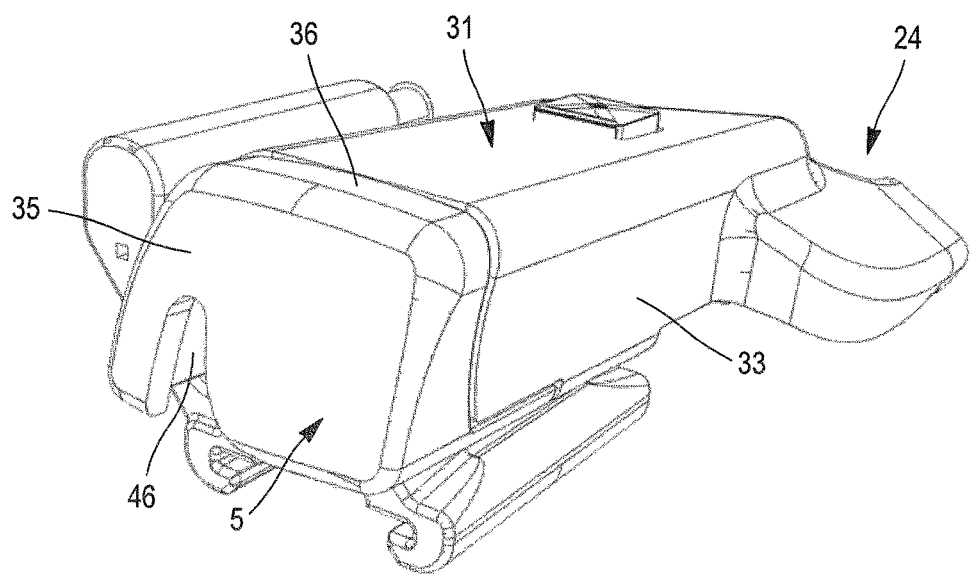
Figure 3:
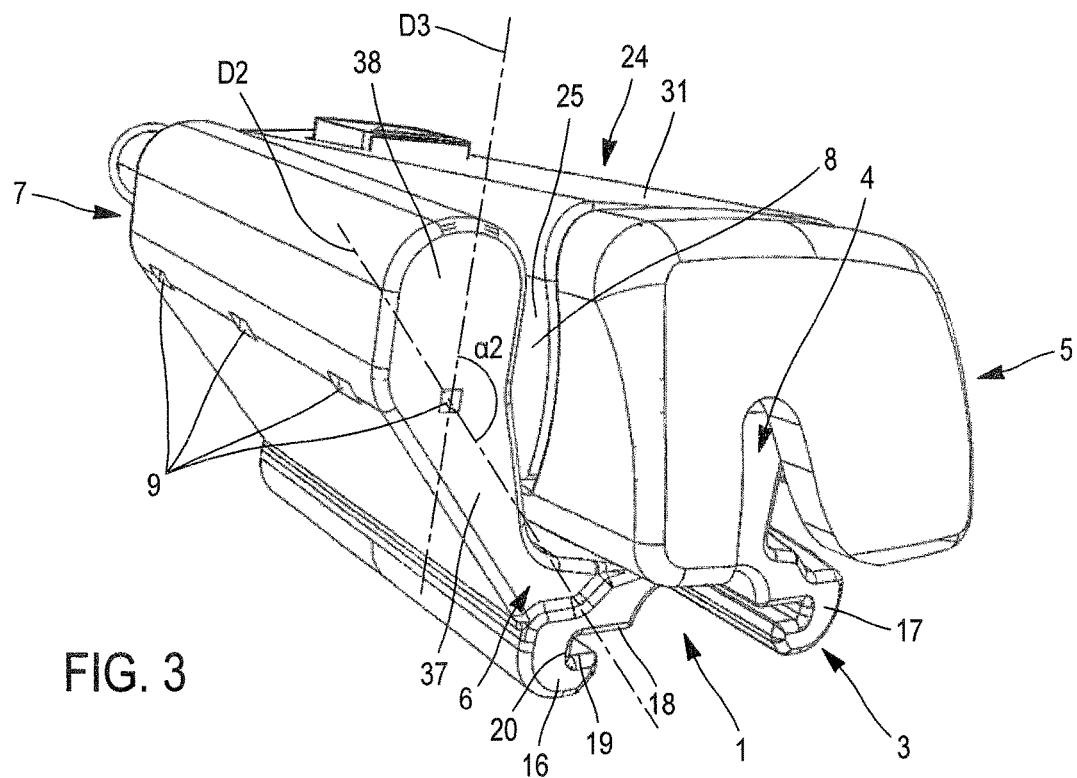
Figure 4:
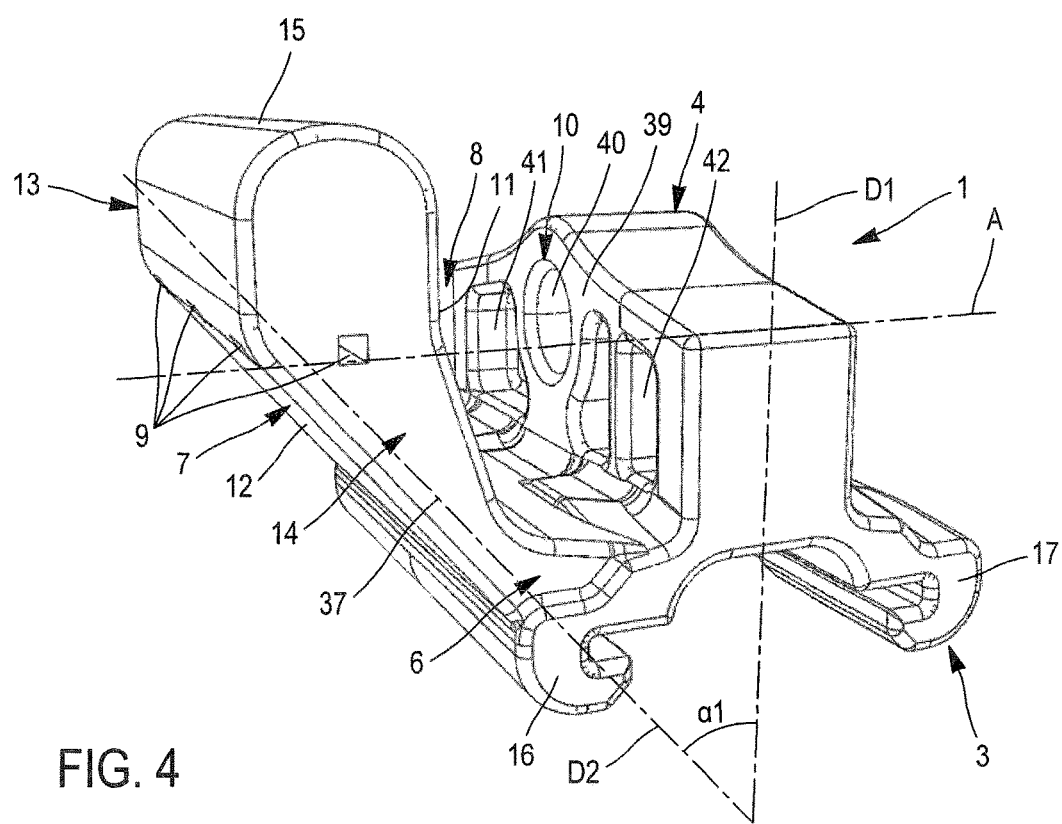
Figure 5:
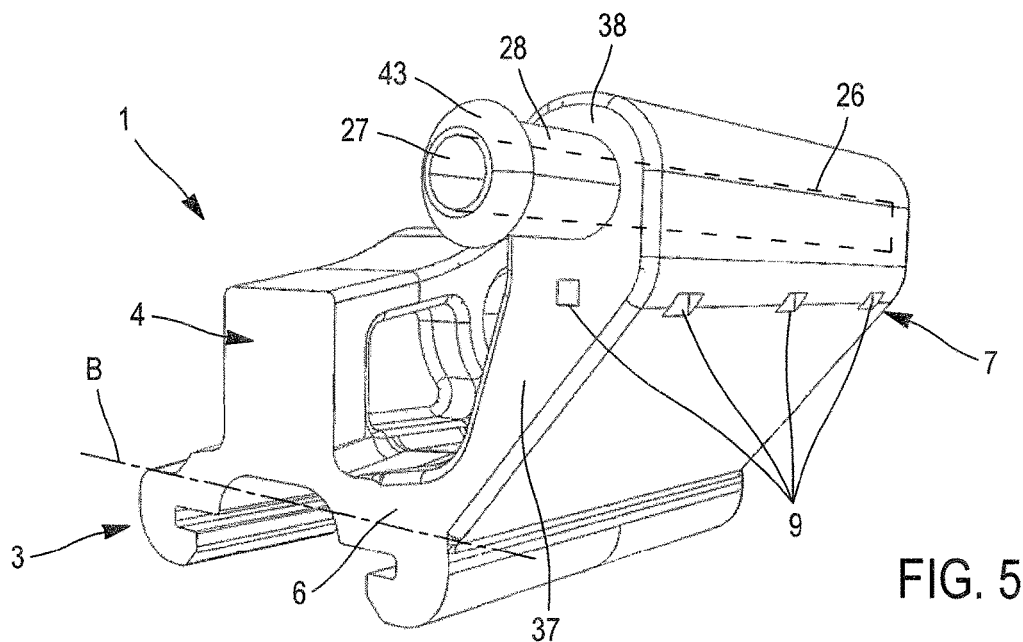
Figure 6:
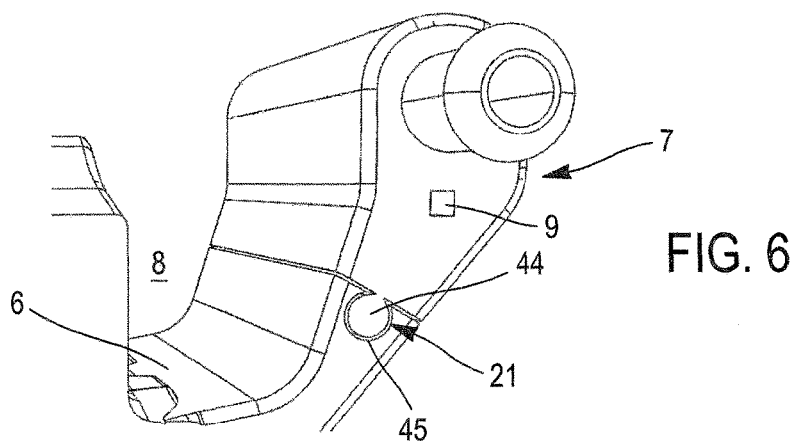
Figure 7:
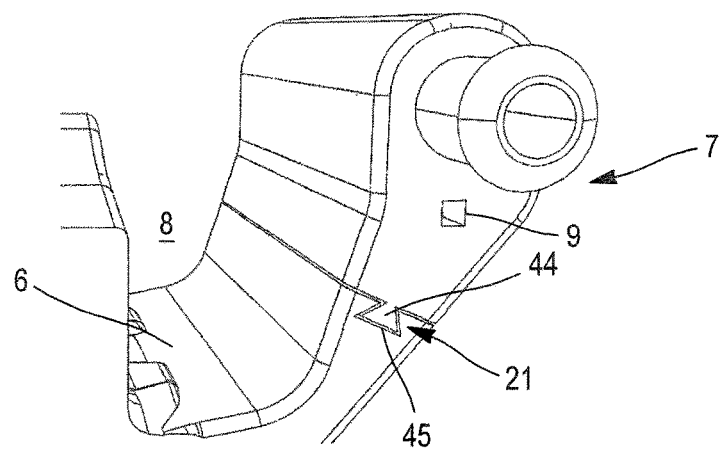

Other features, details and advantages of the invention will emerge more clearly on reading the description given below by way of indication in relation to the drawings in which:

FIG. 1 is a general view, in perspective, of a windscreen wiper according to the invention, FIG. 2 is a perspective view of an end of the wiper arm, on which is mounted the connection device according to the invention, FIG. 3 is a perspective view of the connection device, its adapter and the end of the wiper arm according to the invention, FIG. 4 is a side view, in perspective, of the connection device used in FIGS. 2 and 3, FIG. 5 is a view from another side, in perspective, of the connection device according to FIG. 4, FIG. 6 is a detail view, in perspective, of a first embodiment of the connection device according to the invention, FIG. 7 is a detail view, in perspective, of a second embodiment of the connection device according to the invention.

It should first of all be noted that the figures explain the invention in a detailed manner so as to be able to implement the invention, said figures of course being able to serve to better define the invention as appropriate.

Hereinafter in the description, the terms longitudinal or lateral, above, below, in front, behind refer to the orientation of the windscreen wiper or of the connection device according to the invention. The longitudinal direction corresponds to the main axis of the windscreen wiper in which it extends, whereas the lateral orientations correspond to intersecting straight lines, that is to say lines which cross the longitudinal direction, notably at right angles to the longitudinal axis of the windscreen wiper in its plane of rotation. For the longitudinal directions, the terms outer or inner are understood relative to the point of fixing of the windscreen wiper onto the wiper arm, the term inner corresponding to the part where the arm and a half-wiper extend. Finally, the directions referred to as upper or lower correspond to orientations at right angles to the plane of rotation of the windscreen wiper, the term lower containing the plane of the windscreen.

Referring first of all to FIG. 1, a windscreen wiper 2 according to the invention can be seen. Such a windscreen wiper 2 is used to scrape a window of a vehicle and displace the water deposited on this window out of the field of view of a driver. The windscreen wiper 2 consists of a connection device 1 according to the invention, capped by an adapter 5 and whose function is to interface a same connection device 1 with several types of wiper arm. The windscreen wiper 2 also comprises at least one flexible support 23, one or more air deflectors 29, a rubbing blade 22 and at least one, even two, end fittings 30 installed on each terminal part of the flexible support 23.

The flexible support 23 can take the form of a single flat and elastic metal strip. According to an alternative, the flexible support 23 can be formed by two metal and elastic strips each housed in a groove formed on either side of the blade 22. In both of the above cases, in the rest state such a metal strip is recognizable in that it is bent in a plane at right angles to a longitudinal direction of the strip. The function of such a metal strip, whether single or double, is to distribute the bearing loads along the blade 22 generated by the connection means 1 attached to the flexible support 23 at the centre, longitudinally, of the windscreen wiper 2.

FIG. 2 shows an end 31 of the wiper arm 24. This end 31 has a "U"-shaped section with a back 32 and two arms 33 and 25 deriving from the back 32.

Within a volume delimited by the back 32 and the two arms 33 and 25 the adapter 5 is at least partly housed. More particularly, this adapter 5 comprises a body received in the internal volume and at the end of which is located a head 35. This head cuts off an extreme part of the adapter 5 and has a wall 36 aligned on the U-shaped profile of the end 31. A slot 46 is produced in the head 35 of the adapter 5 in order to avoid any mechanical interferences with the air deflector situated outside the windscreen wiper 2.

FIG. 3 illustrates in more detail an example of the structure of the connection device 1 according to the invention, equipped with the adapter 5 and the end 31 of the arm 24. The connection device 1 comprises a means 3 for securing to the windscreen wiper topped by a link means 4 to the adapter, the latter being linked to the wiper arm 24 via the adapter 5, The function of the securing means 3 is to grip and fix the connection device 1 in a structural zone of the windscreen wiper, such a zone being formed substantially at the centre, along the longitudinal axis of the wiper, of the flexible support forming the wiper. As an example, the securing means 3 takes the form of hooks referenced 16 and 17 arranged to fix an edge of the flexible structure. For this, each hook 16 or 17 comprises a "U"-shaped section in which a first face 18 of the "U" comes into contact with a top face of the flexible structure of the windscreen wiper, a second face 19 of the "U" also comes into contact (to within the mounting play) with a bottom face of the flexible structure of the windscreen wiper. Between these two faces, there is a third face 20 which extends in a plane that is overall parallel to a plane of extension of a slice of the flexible structure of the windscreen wiper.

The securing means 3 can also comprise a blocking device which limits any longitudinal translation of the connection device 1 with respect to the flexible structure.

Above this securing means 3, there is the link means 4 with the adapter 5. This is a mechanical link with a degree of freedom allowing a rotation between the adapter 5 and the connection device 1. The function of the link means 4 is to ensure a rotational link with the adapter 5, this rotation allowing the windscreen wiper to follow the curvature of the windscreen that it wipes.

According to the invention, the connection device 1 comprises a platform 6 derived from the securing means 3, otherwise called base. It will be understood here that the platform 6 emerges on the securing means 3, notably above one of the two hooks 16. Such a platform 6 extends longitudinally along the securing means 3, notably in a manner parallel thereto. This platform 6 thus forms an interface between the securing means 3 and a component 7 which extends substantially vertically, in a same direction as the direction in which the link means 4 extends, This component 7 forms an extension of the platform 6 flaring in a direction transversal to the longitudinal direction of the connection device 1. The component 7 thus comprises a first portion 37 which extends in a longitudinal plane of direction D2. This first portion is for example flared, and it is followed by a second portion 38 of non-flared form which extends in a longitudinal plane of axis D3. The axis D2 and the axis D3 are intercepting and non-parallel and form an angle α2 lying between 120° and 179°, such that the direction of the axis D3 is parallel to a direction of extension of the link means 4 at right angles to the wiping plane of the windscreen wiper.

At least one orifice 9 for spraying liquid to wash the window is formed in the component 7. According to the embodiment illustrated in FIG. 3, the orifice 9 is formed at the boundary between the first portion 37 and the second portion 38 defining the component 7. In the case of FIGS. 3 and 4, the component 7 comprises five spraying orifices 9, three of which emerge in a same face, hereinafter called outer face 12, and two emerge each in an intersecting face, called lateral face 13 and 14.

FIG. 4 shows the connection device 1 on its own. The component 7, the platform 6 and the link means 4 at least partially delimit a housing 8 suitable for receiving at least a part of the adapter 5, visible in FIG. 3. This housing 8 is also adapted to receive the arm 25 of the end of the arm, the arm thus forming an example of a part of the arm which extends into the housing 8.

This housing 8 is an upwardly open longitudinal space and at each of the longitudinal ends of the connection device 1. This housing 8 is thus edged at least by the platform 6, the component 7, more particularly its inner wall 11, and the link means 4 which is directly above the securing means 3, through a face 39.

The component 7 is delimited by an inner wall 11, that is to say facing towards the housing 8 and at least partly facing the link means 4. The component 7 is also delimited by a so-called outer wall 12, in as much as it faces the environment surrounding the connection device 1. The inner wall 11 and the outer wall 12 are joined to one another by at least two lateral walls 13, 14. The first portion 37 and the second portion 38 described above form one of the lateral walls 13 or 14. The component 7 is finally delimited by a so-called distal wall 15 in as much as it forms the free end of the component 7. It is thus opposite the platform 6.

According to this exemplary embodiment, the spraying orifice or orifices 9 are formed exclusively in the outer wall 12 and in one of the two lateral walls, here referenced 14.

The link means 4 comprises a pivoting means 10. According to an exemplary embodiment, the pivoting means takes the form of a hole 40 passing transversely through the link means 40. Such a hole 40 forms a bearing which receives either an independent rotation shaft or strands formed in the adapter 5. Alternatively, the pivoting means 10 can be formed by two cylindrical shafts formed in place of the hole and emerging on either side of the faces delimiting the link means 4. Whatever the solution retained, the function of this pivoting means is to generate a rotation about an axis A between the link means 4 and the adapter 5, the axis A passing through the pivoting means 10.

According to a nonlimiting exemplary embodiment, the spraying orifice 9 is formed at least at the level of the axis A or beyond the latter, moving away from the platform 6. The spraying orifice 9 can thus be placed between a longitudinal plane passing through the axis A and the distal wall 15 of the component 7.

Interestingly, the invention provides for the direction D1 passing through the link means 4 to form an angle α1 lying between 15° and 55° with the straight line D2 defining the general direction of extension of the component 7. More particularly, the direction D2 illustrates the direction of extension of the first portion 37 of the component 7. Such an angular arrangement of the directions D1 and D2 is valid longitudinally along the connection device 1. In other words, the link means 4 extends in a plane passing through the direction D1, whereas the component 7 extends in a plane passing through the direction D2, the angle α1 lying between 15° and 55° being formed between these two planes.

It will also be noted that the link means comprises at least two cavities 41 and 42 formed on either side of the pivoting means 10.

FIG. 5 is a view showing the connection device 1 according to an arrangement substantially identical to FIG. 4. One of the lateral faces referenced 13 and delimiting the component 7 can be seen in this figure. A single spraying orifice 9 is formed through the lateral face 13.

According to one embodiment, the liquid spraying component 7 comprises at least one duct 26. The latter channels the liquid from an inlet 27 to the spraying orifice 9. In the case of a plurality of spraying orifices 9, this same duct feeds the spraying orifices. Such a duct 26 is advantageously rectilinear in the second portion 38 of the spraying component 7.

The spraying component 7 can also comprise a feed nozzle 28 which extends from one of the lateral walls 13 delimiting the component 7. This nozzle 28 extends rectilinearly and coaxially with the duct 26. Such a nozzle 28 comprises a collar 43 forming a retaining means when a tube feeding liquid from the vehicle is threaded onto the nozzle 28.

FIG. 5 also shows a line of axis B which schematically illustrates the line of demarcation between the securing means 3 and the link means 4.

In the embodiment described above, the component 7 and the platform 6 are of a single piece and inseparable, except by destroying one or other of these parts.

FIGS. 6 and 7 show a variant embodiment in which the component 7, advantageously equipped with its spraying orifice 9, is added onto the platform 6. In case of replacement of a worn windscreen wiper, this structure makes it possible to dismantle the component 7 to recover it and thus install it on the new windscreen wiper. The cost of the replacement wiper can thus be kept as low as possible.

Thus, the component 7 and the platform 6 comprise fixing means 21 arranged to assemble the component 7 on the platform 6. These fixing means 21 are formed both on the component 7 and on the platform 6. Advantageously, the fixing means 21 are forms 44 and 45 worked on the component 7 and on the platform 6, these forms being complementary to one another.

By way of example of these forms, the component 7 comprises a tenon of circular section whereas the platform 6 comprises a groove of section that is also circular. Obviously, the invention covers the reverse situation where the tenon is formed on the platform 6 whereas the groove is worked in a face delimiting the component 7.

Alternatively, and as can be seen in FIG. 7, the tenon and the groove have a trapezoidal section.

In both cases, the fixing means 21 are said to be slide-fixing means, in as much as they are arranged to allow the component 7 to slide relative to the platform 6.

Alternatively, the fixing means 21 are said to be clipping means, in as much as they are arranged to allow a rotation of one part relative to the other in order to immobilize them relative to one another.

In the above description, the component and the platform are formed on a single side of the securing means. Alternatively, the invention extends to a connection device which comprises two components and two platforms formed on each side of the securing means. Such a solution makes it possible to produce a sprinkling of the windscreen during an upward phase and during a downward phase of the windscreen wiper.

The invention claimed is:

1. A windscreen wiper comprising:
    a blade suitable for being applied against a window of a vehicle,
    a flexible structure linked to the blade, and
    a connection device comprising:
        a securing means secured to the flexible structure substantially at a center of a longitudinal direction of the flexible structure, the connection device suitable for linking the flexible structure to a wiper arm, the securing means topped by a means for linking to an adapter linked to the wiper arm, a platform derived from the securing means, and a component which extends from the platform, and the component, the platform and the link means at least partially delimit a housing suitable for receiving at least a part of the adapter,
    wherein at least one liquid spraying orifice is formed through a wall of the component.

2. The windscreen wiper according to claim 1, in which at least one duct is formed in the component to transport the liquid from a liquid inlet to said spraying orifice.

3. The windscreen wiper according to claim 1, in which the link means comprises a pivoting means suitable for rotating the link means about an axis relative to the adapter, and in which the spraying orifice is formed at the level of the axis or beyond the level of the axis, moving away from the platform.

4. The windscreen wiper according to claim 1, in which the component is delimited by an inner wall facing towards the housing, an outer wall, at least two lateral walls joining the inner wall to the outer wall and a distal wall opposite the platform, the spraying orifice being formed exclusively in the outer wall and/or in the lateral walls.

5. The windscreen wiper according to claim 4, in which a feed nozzle is formed on one of the lateral walls delimiting the component.

6. The windscreen wiper according to claim 1, in which the link means extends in a direction at right angles to a wiping plane of the windscreen wiper, the component extending in a second direction, and in which an angle formed between the first direction and the second direction lies between 15° and 55°.

7. The windscreen wiper according to claim 1, in which the component and the platform are of a single piece.

8. The windscreen wiper according to claim 1, in which the component and the platform comprise fixing means arranged to assemble the component on the platform.

9. The windscreen wiper according to claim 8, in which the fixing means are implemented by complementary forms formed respectively on the component and on the platform.

10. The windscreen wiper according to claim 8, in which the fixing means are slide-fixing means.

11. The windscreen wiper according to claim 8, in which the fixing means are clipping means.

12. The windscreen wiper according to claim 1, further comprising an adapter linked in rotation with the connection device and which extends at least partly into the housing.

13. A system for wiping a window of a vehicle comprising:
    the windscreen wiper according to claim 1; and
    a wiper arm, in which a part of the wiper arm extends into the housing.

* * * * *